US012809085B2

(12) United States Patent
Take et al.

(10) Patent No.: US 12,809,085 B2
(45) Date of Patent: Nov. 24, 2026

(54) OPTICAL DEVICE

(71) Applicant: TDK CORPORATION, Tokyo (JP)

(72) Inventors: Hiroshi Take, Hong Kong (CN); Kenji Nagase, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 289 days.

(21) Appl. No.: 18/619,841

(22) Filed: Mar. 28, 2024

(65) Prior Publication Data

US 2024/0329316 A1 Oct. 3, 2024

(30) Foreign Application Priority Data

Mar. 30, 2023 (CN) ......................... 202310332220.3

(51) Int. Cl.
*G02B 6/125* (2006.01)
*G02B 6/12* (2006.01)
(Continued)

(52) U.S. Cl.
CPC ......... *G02B 6/125* (2013.01); *G02B 6/12016* (2013.01); *G02B 6/122* (2013.01);
(Continued)

(58) Field of Classification Search
CPC .... G02B 6/12016; G02B 6/122; G02B 6/125; G02B 6/24; G02B 6/28; G02B 6/2804;
(Continued)

(56) References Cited

U.S. PATENT DOCUMENTS 5,138,687 A * 8/1992 Horie .................. G02B 6/1245 385/129
6,921,490 B1 * 7/2005 Qian ..................... G02B 6/138 216/24

(Continued)

FOREIGN PATENT DOCUMENTS

JP 2016-4238 A * 1/2016
JP 2017-215526 A * 12/2017

OTHER PUBLICATIONS

M. Li et al. Low-loss, broadband MMI coupler based on thin film lithium niobate platform. Physica Scripta, vol. 98 No. 3, 035506, Feb. 13, 2023 (https://doi.org/10.1088/1402-4896/acb6bf) (Year: 2023).*

(Continued)

*Primary Examiner* — Michael Stahl
(74) *Attorney, Agent, or Firm* — Oliff PLC

(57) ABSTRACT

An optical device includes: a substrate; and at least two optical waveguides formed on the substrate and facing to a multiplexed portion on the substrate in a light propagation direction, the optical waveguide includes a lamellar portion and a protruding portion which protrudes from the lamellar portion, in a cross section perpendicular to the light propagation direction, the thickness of the lamellar portion between the protruding portions of the at least two optical waveguides is greater than the thickness of the lamellar portion at the side of a side surface of the protruding portion of the optical waveguides, which does not face to other optical waveguides. Thereby, the transmission loss of light during multiplexing light can be reduced.

8 Claims, 2 Drawing Sheets

(51) Int. Cl.
*G02B 6/122* (2006.01)
*G02B 6/28* (2006.01)
*G02B 6/24* (2006.01)

(52) U.S. Cl.
CPC ......... *G02B 6/2804* (2013.01); *G02B 6/2813* (2013.01); *G02B 6/24* (2013.01)

(58) Field of Classification Search
CPC ... G02B 6/2808; G02B 6/2813; G02F 1/3137; G02F 1/3138
USPC ....................................................... 385/41–46
See application file for complete search history.

(56) References Cited

U.S. PATENT DOCUMENTS

| | | | | |
|---|---|---|---|---|
| 7,116,880 | B1 * | 10/2006 | Liu | G02B 6/2813 385/129 |
| 7,272,279 | B2 | 9/2007 | Ishikawa et al. | |
| 11,537,026 | B2 | 12/2022 | Zhang et al. | |
| 2015/0078708 | A1 * | 3/2015 | Park | G02B 6/262 385/39 |
| 2015/0253472 | A1 * | 9/2015 | Kumar | G02B 6/122 385/14 |
| 2016/0062038 | A1 * | 3/2016 | Oka | G02B 6/2766 385/28 |
| 2024/0077686 | A1 * | 3/2024 | Pelc | G02B 6/42 |
| 2024/0329307 | A1 * | 10/2024 | Take | G02B 6/122 |

OTHER PUBLICATIONS

Boris Desiatov et al. "Ultra-Low-Loss Integrated Visible Photonics Using Thin-Film Lithium Niobate". Optica, Mar. 2019, vol. 6, No. 3, pp. 380-384.

* cited by examiner

OPTICAL DEVICE

FIELD OF THE INVENTION

The present invention relates to an optical device.

BACKGROUND OF THE INVENTION

Communication traffic has been remarkably increased with widespread Internet use, and optical fiber communication is becoming significantly important. The optical fiber communication is a technology that converts an electric signal into an optical signal and transmits the optical signal through an optical fiber and has the characteristics of wide bandwidth, low loss, and resistance to noise.

Patent document 1 (JP 2007-114253) discloses a waveguide type light splitting element, which splits the light incident from two input-side optical fibers to multiple output-side optical fibers.

In the light splitting element in patent document 1, the transmission loss is reduced by tilting a sidewall of a coupling waveguide located in a forestage of a multiplexed portion. However, it is expected to further reduce the transmission loss during multiplexing.

CITATION LIST

Patent Document

Patent Document 1: JP 2007-114253.

SUMMARY OF THE INVENTION

The present invention is completed in view of the above problems, and its object is to provide an optical device capable of reducing transmission loss during multiplexing light.

The present application provides an optical device, comprising: a substrate; and at least two optical waveguides formed on the substrate and facing to a multiplexed portion on the substrate in a light propagation direction, the optical waveguide comprises a lamellar portion and a protruding portion which protrudes from the lamellar portion, in a cross section perpendicular to the light propagation direction, the thickness of the lamellar portion between the protruding portions of the at least two optical waveguides is greater than the thickness of the lamellar portion at the side of a side surface of the protruding portion of the optical waveguides, which does not face to other optical waveguides.

In the optical device according to the present invention, since in a cross section perpendicular to the light propagation direction, the thickness of the lamellar portion between the protruding portions of the at least two optical waveguides is greater than the thickness of the lamellar portion at the side of a side surface of the protruding portion of the optical waveguide, which does not face to other optical waveguides, the light propagating through the at least two optical waveguides tends to propagate between the optical waveguides when approaching the multiplexed portion, so that the optical loss on the outer sides of the optical waveguides is reduced, thus reducing the light transmission loss during multiplexing light.

Further, in the optical device according to the present invention, preferably, in the cross section perpendicular to the light propagation direction, the thickness of the lamellar portion between the protruding portions of the at least two optical waveguides is less than ½ of the distance from a top end of the protruding portion to the substrate. Therefore, the light transmission loss can be further reduced.

Further, in the optical device according to the present invention, preferably, the optical device further comprises a protection layer formed adjacent to the optical waveguides.

Further, in the optical device according to the present invention, preferably, the optical waveguides are formed of an oxide containing lithium.

Further, in the optical device according to the present invention, preferably, the oxide containing lithium is epitaxial lithium niobate or lithium tantalate.

Further, in the optical device according to the present invention, preferably, in the cross section perpendicular to the light propagation direction, an angle formed between the substrate and the side surface of the protruding portion of the optical waveguide, which does not face to other optical waveguides, is 85° or more. Therefore, the light transmission loss on the outer sides of the at least two optical waveguides during multiplexing light can be further avoided.

Advantageous Effects of the Invention

The optical device according to the present invention can effectively reduce the light transmission loss during multiplexing light.

DETAILED DESCRIPTION

The optical devices involved in the embodiments will be described below. In the description of each figure, the same or equivalent elements are marked with the same reference number, and sometimes repeated description is omitted.

Embodiment 1

Figure 1:
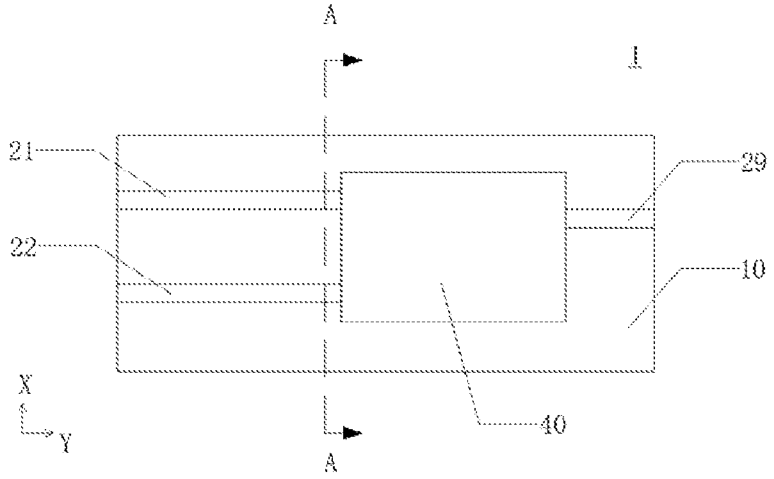
FIG. 1 schematically illustrates a top view of an optical device according to an embodiment of the present invention.
Figure 2:
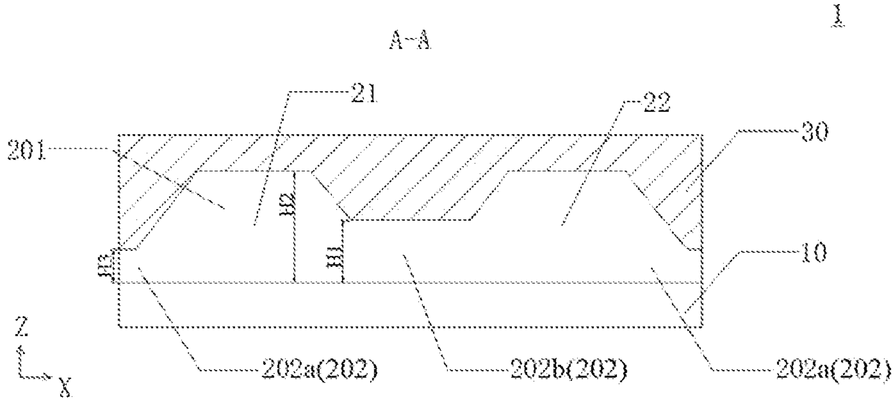
FIG. 2 schematically illustrates a cross-sectional view of an optical device according to an embodiment of the present invention along line A-A of FIG. 1.

FIG. 1 schematically illustrates a top view of an optical device according to an embodiment of the present invention. FIG. 2 schematically illustrates a cross-sectional view of an optical device according to an embodiment of the present invention along line A-A of FIG. 1. A light propagation direction is set as Y direction, a thickness direction of the substrate perpendicular to the Y direction is set as Z direction, and a direction perpendicular to both Y and Z directions is set as X direction.

Referring to FIG. 1, the optical device 1 according to embodiment 1 comprises a substrate 10 and two optical waveguides 21, 22 formed on the substrate 10 and facing to a multiplexed portion 40 on the substrate 10 in a light propagation direction, i.e., Y direction. The two optical waveguides 21, 22 are multiplexed to one output optical waveguide 29 through the multiplexed portion 40. Therefore, the light incident from the optical waveguides 21, 22 respectively is multiplexed at the multiplexed portion 40 and outputted from the optical waveguide 29. Here, only one output optical waveguide 29 is illustrated, but it should be understood that multiple output optical waveguides may be arranged. In addition, in this figure, the optical waveguides 21, 22 extend along the Y direction, but they may also extend obliquely or curvedly along an X-Y plane on a main plane of the substrate 10 as needed.

FIG. 2 illustrates the cross-sectional shape of a portion of the optical waveguides 21, 22 close to the multiplexed portion 40. Here, the portion close to the multiplexed portion 40 refers to a portion having a distance less than a predetermined distance to the multiplexed portion along the light propagation direction. The predetermined distance, for example, is 0.5 μm-100 μm. Referring to FIG. 2, in an X-Z cross section perpendicular to the light propagation direction, each of the optical waveguides 21, 22 includes a lamellar portion 202 and a protruding portion 201 protruding from the lamellar portion 202. The lamellar portion 202 includes a portion 202*b* between the two optical waveguides, and a portion 202*a* at the side of a side surface of the protruding portion 201 of the optical waveguide, which does not face to other optical waveguides. Here, the height of 202*b* is set as H1 and the height of 202*a* is set as H3. In the optical device 1 according to this embodiment, H1>H3 is satisfied.

In the optical device 1, in a case that H1 of the lamellar portion between the optical waveguides is small, when the input light respectively from the optical waveguides 21, 22 are multiplexed at the multiplexed portion 40, optical loss is easy to occur since the lamellar portion between the optical waveguides is thin. Oppositely, in this embodiment, the height H1 of the portion 202*b* located between the optical waveguides 21, 22 is set to be greater than the height H3 of 202*a*, that is, H1>H3. Therefore, compared with the case where H1≤H3, the light propagating through the optical waveguides 21, 22 tends to propagate between the optical waveguides (an area between the optical waveguide 21, 22) when approaching the multiplexed portion 40, so that the optical loss on the outer sides of the optical waveguides 21, 22 is reduced. Therefore, the light transmission loss during multiplexing light can be reduced.

Further, in the X-Z cross section perpendicular to the light propagation direction, the distance from the top end of the protruding portion 201 to the substrate 10 is set as H2. In the optical device 1 according to this embodiment, H1≤½*H2. By setting H1 to be less than or equal to ½*H2, compared with the case where H1>½*H2, the light tends more greatly to propagate along the extension direction of the optical waveguides 21, 22 in the X-Z cross section. Therefore, the light transmission loss can be further reduced.

Referring to FIG. 2, the optical device 1 further comprises a protection layer 30 formed adjacent to the optical waveguides 21, 22, 29. The protection layer 30 prevents the light propagating through the optical waveguides 21, 22, 29 from being absorbed by other components of the optical device (such as electrode). Thus, the material of the protection layer 30 may be widely selected as long as the protection layer 30 can function as an intermediate layer between the optical waveguides and signal electrodes and its material is non-metallic. For example, the protective layer 30 may be a ceramic layer made of an insulating material such as metal oxide, metal nitride, or metal carbide. The material of the protective layer 30 can be a crystalline material or an amorphous material. The protective layer 30 is preferably formed of a material with a lower refractive index than the optical waveguide, such as, $Al_2O_3$, $SiO_2$, $LaAlO_3$, $LaYO_3$, ZnO, $HfO_2$, MgO, $Y_2O_3$ etc.

Optical waveguides 21, 22, 29 are not particularly limited as long as they are made of an electro-optical material. The optical waveguides are preferably formed of an oxide containing lithium. The optical waveguides are more preferably composed of epitaxial lithium niobate ($LiNbO_3$) or lithium tantalate ($LiTaO_3$). This is because lithium niobate or lithium tantalate has a large electro-optical constant and is suitable as a constituent material for optical devices such as light modulators. Hereafter, the structure of the present invention will be described below in detail in a case that the optical waveguides 21, 22, 29 are lithium niobate film.

The substrate 10 is not particularly limited as long as it has a lower refractive index than the lithium niobate film, but it is preferable a substrate on which a lithium niobate film can be formed as an epitaxial film, and a sapphire single crystal substrate or a silicon single crystal substrate is preferable. The crystal orientation of the single crystal substrate is not particularly limited. The lithium niobate film has properties such as being easily formed as a c-axis-oriented epitaxial film with respect to single crystal substrates of various crystal orientations. Since the c-axis oriented lithium niobate film has three-fold symmetry, it is desirable that the underlying single crystal substrate also has the same symmetry. In the case of a sapphire single crystal substrate, a c-plane substrate is preferred, and in the case of a silicon single crystal substrate, a (111) plane substrate is preferred.

Here, the epitaxial film is a film oriented in alignment with the crystal orientation of the underlying substrate or underlying film. When the film plane is defined as the XY plane and the film thickness direction is defined as the Z axis, the crystals are aligned and oriented along the X, Y and Z axes. For example, the epitaxial film can be verified by first confirming the intensity at the orientation position by 2θ-θ X-ray diffraction and secondly confirming the pole.

Specifically, first, when measurement is performed by 2θ-θ X-ray diffraction, the peak intensity of all peaks other than the target surface is 10% or less, preferably 5% or less, of the maximum peak intensity of the target surface. For example, in a c-axis oriented epitaxial film of lithium niobate, the peak intensity of planes other than the (00L) plane is 10% or less, preferably 5% or less of the maximum peak intensity of the (00L) plane. (00L) is a generic term for equivalent planes such as (001) and (002).

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNbA_yO_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 303.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film is preferably formed using a film formation method, such as sputtering, CVD or sol-gel process. Application of an electric field in parallel to the c-axis of the lithium niobate that is oriented perpendicular to the main surface of the substrate can change the optical refractive index in proportion to the electric field.

In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. As a formation method for the lithium niobate film, there is known a method of thinly polishing or slicing the lithium niobate single crystal substrate. This method has an advantage that characteristics same as those of the single crystal can be obtained and can be applied to the present invention.

Embodiment 2

Figure 3:
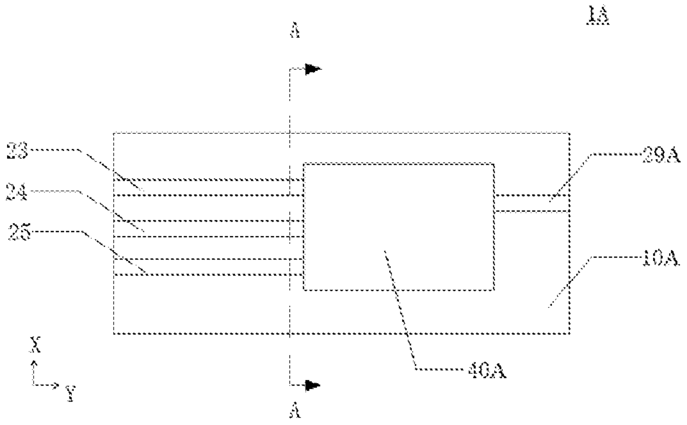
FIG. 3 schematically illustrates a top view of an optical device according to another embodiment of the present invention.
Figure 4:
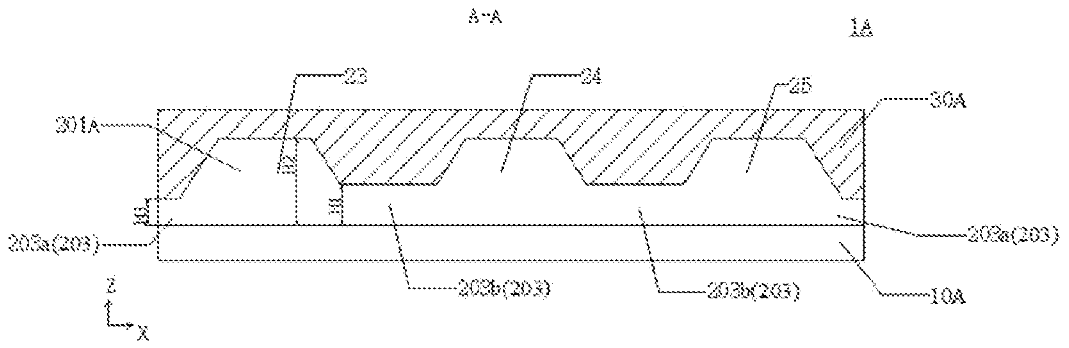
FIG. 4 schematically illustrates a cross-sectional view of an optical device according to another embodiment of the present invention along line A-A.

The difference between embodiment 2 and embodiment 1 is that there are two or more (in this case, three) optical waveguides 23, 24, 25 in embodiment 2. Hereafter, description will be made to the difference between embodiment 1 and embodiment 2. FIG. 3 schematically illustrates a top view of an optical device according to embodiment 2 of the present invention. FIG. 4 schematically illustrates a cross-sectional view of an optical device according to embodiment 2 of the present invention along line A-A.

Referring to FIG. 3, the optical device 1A according to embodiment 2 comprises a substrate 10A and three optical waveguides 23, 24, 25 formed on the substrate 10A and facing to a multiplexed portion 40A on the substrate 10A in a light propagation direction, i.e., Y direction. The three optical waveguides 23, 24, 25 are multiplexed to one output optical waveguide 29A through the multiplexed portion 40A. Therefore, the light incident from the optical waveguides 23, 24, 25 respectively is multiplexed at the multiplexed portion 40A and outputted from the optical waveguide 29A. Here, only one output optical waveguide 29A is illustrated, but it should be understood that multiple output optical waveguides may be arranged.

FIG. 4 illustrates the cross-sectional shape of a portion of the optical waveguides 23, 24, 25 close to the multiplexed portion 40A. Here, the portion close to the multiplexed portion 40A refers to a portion having a distance less than a predetermined distance to the multiplexed portion along the light propagation direction. The predetermined distance, for example, is 0.5 μm-100 μm. Referring to FIG. 4, in an X-Z cross section perpendicular to the light propagation direction, each of the optical waveguides 23, 24, 25 includes a lamellar portion 203 and a protruding portion 201A protruding from the lamellar portion 203. The lamellar portion 203 includes a portion 203*b* between the two optical waveguides, and a portion 203*a* at the side of a side surface of the protruding portion 201A of the optical waveguide, which does not face to other optical waveguides. Here, the height of 203*b* is set as H1 and the height of 203*a* is set as H3. In the optical device 1A according to this embodiment, satisfies: H1>H3.

In the optical device 1A, in a case that H1 of the lamellar portion between the optical waveguides is small, when the input light respectively from the optical waveguides 23, 24, 25 are multiplexed at the multiplexed portion 40A, optical loss is easy to occur since the lamellar portion between the optical waveguides is thin. Oppositely, in this embodiment, the height H1 of the portion 203*b* located between the optical waveguides 23~25 is set to be greater than the height H3 of 203*a*, that is, H1>H3. Therefore, compared with the case where H1≤H3, the light propagating through the optical waveguides 23~25 tends to propagate between the optical waveguides (an area between the optical waveguides 23, 24 and between the optical waveguides 24, 25) when approaching the multiplexed portion 40A, so that the optical loss on the outer sides of the optical waveguides 23, 25 is reduced. Therefore, the light transmission loss during multiplexing light can be reduced.

Further, in the X-Z cross section perpendicular to the light propagation direction, the distance from the top end of the protruding portion 201A to the substrate 10A is set as H2. In the optical device 1A according to this embodiment, H1≤½*H2. By setting H1 to be less than or equal to ½*H2, compared with the case where H1>½*H2, the light tends more greatly to propagate along the extension direction of the optical waveguides 23~25 in the X-Z cross section. Therefore, the light transmission loss can be further reduced. In addition, referring to FIG. 4, the height of the lamellar portion between the optical waveguides 23, 24 is equal to the height of the lamellar portion between the optical waveguides 24, 25. However, these two heights may also be different, as long as both heights are greater than H3 and less than or equal to ½*H2.

Embodiment 3

Figure 5:
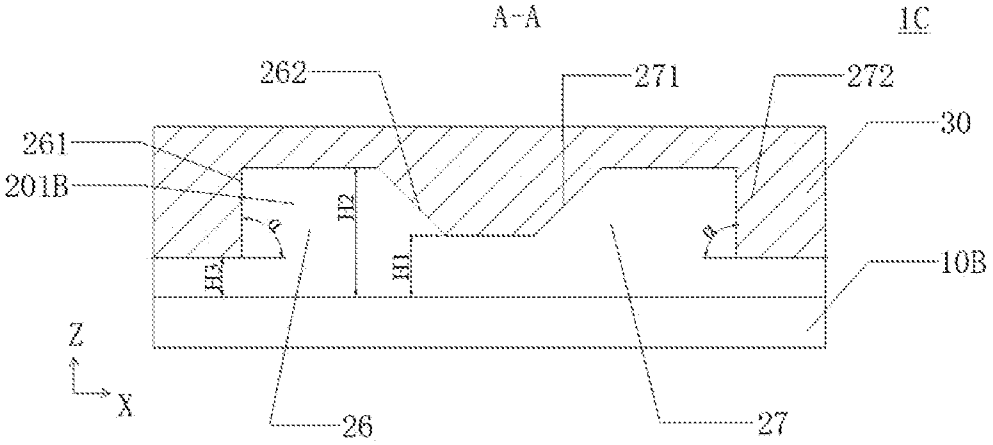
FIG. 5 schematically illustrates a cross-sectional view of an optical device according to another embodiment of the present invention along line A-A.

The difference between embodiment 3 and embodiment 1 is that angles between side surfaces of optical waveguides 26, 27 and the substrate in embodiment 3 are different. Hereafter, description will be made to the difference between embodiment 1 and embodiment 3. FIG. 5 schematically illustrates a cross-sectional view of an optical device according to embodiment 3 of the present invention along line A-A.

Referring to FIG. 5, in the cross section X-Z perpendicular to the light propagation direction, the protruding portion 201B of the optical waveguide 26 comprises two side surfaces 261, 262. The side surface 261 does not face to the optical waveguide 27, while the side surface 262 faces to the side surface 271 of the protruding portion 201B of the optical waveguide 27. Similarly, the protruding portion 201B of the optical waveguide 27 comprises two side surfaces 271, 272. The side surface 272 does not face to the optical waveguide 26, while the side surface 271 faces to the side surface 262 of the protruding portion 201B of the optical waveguide 26.

Angles α formed between the substrate 10B and the side surfaces 261, 272, of the protruding portions 201B of the optical waveguides 26, 27 which do not face to other optical waveguides, are 85° or more and 90° or less. Moreover, the side surfaces 262, 271 of the optical waveguides 26, 27 which face to other optical waveguides may also be inclined to the substrate. As a result, the light propagating through the optical waveguides 26, 27 further tends to propagate between the optical waveguides (an area between the optical waveguides 26, 27) when approaching the multiplexed portion 40. Therefore, the light transmission loss during multiplexing light can be further reduced. Here, ideally, it is expected that the angles α formed between the side surfaces 261, 272 of the optical waveguides 26, 27 and the substrate 10B are 90°. From the perspective of manufacturing errors and manufacturing ease, the angle is preferably 85° or more.

FIG. 5 illustrates the case that the optical device comprises two optical waveguides 26, 27 as input optical waveguides. It should be understood that the number of input optical waveguides may also be three or more, as shown in embodiment 2.

EXAMPLES

Figure 6:
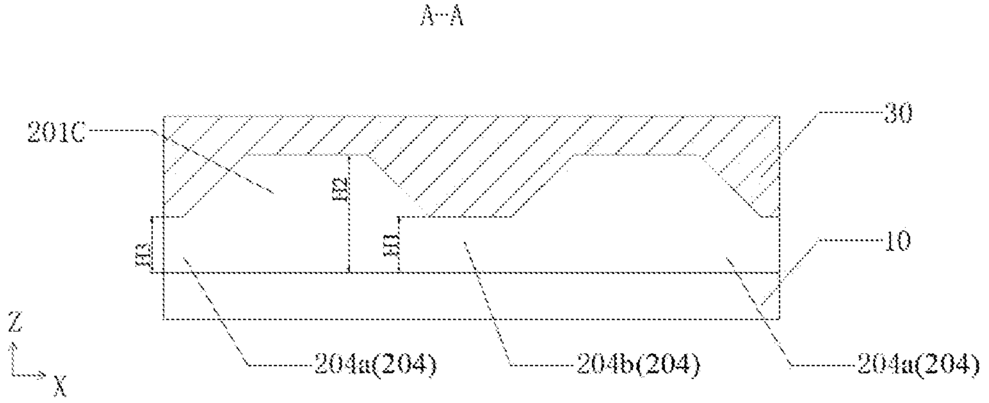
FIG. 6 schematically illustrates an optical device according to a comparative example along line A-A.

Examples 1 and 2 were made according to the structure of the optical device 1 in embodiment 1, and example 3 was made according to the structure of the optical device 1C in embodiment 3. A comparative example was made according to the structure of the optical device illustrated in FIG. 6. The only difference of examples 1, 2, and 3 from the comparative example is that the cross-sectional shape of the optical waveguides 21, 22 close to the multiplexed portion is different. In the comparative example, the height H1 of the portion 204*b* between two optical waveguides is equal to the height H3 of the portion 204*a* at the side of the side surface of the protruding portion 201C of the optical waveguide, which does not face to other optical waveguides, both of which are 0.15 μm (H1=H3=0.15 μm). In example 1, H1 is 0.27 μm and H3 is 0.15 μm, that is, H1>H3. In example 2, the height H1 is further increased to 0.34 μm (i.e., the lamellar portion between the optical waveguides 21, 22 is thicker), and H3 remains to be 0.15 μm. In example 3, compared with example 2, the height H1 of 202*b* remains unchanged, the side surfaces of the protruding portions of the optical waveguides 21, 22, which do not face to other optical waveguides, are configured to be perpendicular to the substrate.

A transmission loss test of light passing through the multiplexed portion was performed on the examples and the comparative example. The experimental results are as shown in Table 1.

TABLE 1

| | Example 1 | Example 2 | Example 3 | Comparative example |
|---|---|---|---|---|
| Transmission loss | 2.4 dB | 2.6 dB | 1.6 dB | 7.0 db |

From Table 1, it can be seen that according to the comparison between examples 1, 2 and the comparative example, the transmission loss can be significantly reduced, through that the height H1 of the portion between the two optical waveguides is greater than the height H3 of the portion at the side of the side surface of the protruding portion of the optical waveguide, which does not face to other optical waveguides. In addition, according to the comparison between example 2 and example 3, the transmission loss can be further reduced by configuring the side surfaces of the protruding portions of the optical waveguides 21, 22, which do not face to other optical waveguides, to be perpendicular to the substrate.

Although the present invention has been described in detail in conjunction with the embodiments with reference to the drawings, it can be understood that the above description does not limit the present invention in any form. The optical devices of the present invention may include, for example, a directional coupler, a multimode interference coupler, a Y-junction coupler, and various interferometers.

Those skilled in the art can make variations and changes to the present invention as needed without deviating from the substantive spirit and scope of the present invention, all of variations and changes still fall within the scope of protection of the present invention.

REFERENCE NUMERAL

Optical device 1, 1A, 1C
Substrates 10, 10A, 10B
Optical waveguide 21-27, 29, 29A
Lamellar portion 202, 202*a*, 202*b*, 203, 203*a*, 203*b*, 204, 204*a*, 204*b*
Protruding portion 201, 201A, 201B, 201C
Multiplexed portion 40, 40A
Protection layer 30, 30A

The invention claimed is:

1. An optical device, comprising:
a substrate; and
at least two optical waveguides formed on the substrate and facing a multiplexer on the substrate in a light propagation direction, wherein
each of the at least two optical waveguides comprises a first lamellar portion and a protruding portion which protrudes from the first lamellar portion,
in a cross section perpendicular to the light propagation direction, a second lamellar portion between respective protruding portions of a pair of optical waveguides among the at least two optical waveguides has a first thickness, a third lamellar portion next to a side surface of the protruding portion of one optical waveguide among the pair of optical waveguides, at a side at which the one optical waveguide does not face another optical waveguide among the pair of optical waveguides, has a second thickness, and the first thickness is greater than the second thickness, and
the optical waveguides each have a cross section perpendicular to the light propagation direction, and all side surfaces of the optical waveguides in the cross section are non-perpendicular to the substrate.

2. The optical device according to claim 1, wherein,
in the cross section perpendicular to the light propagation direction, the first thickness is less than ½ of a distance from a top end of each protruding portion to the substrate.

3. The optical device according to claim 1, wherein
the optical device further comprises a protection layer formed adjacent to the optical waveguides.

4. The optical device according to claim 1, wherein
the optical waveguides are formed of an oxide containing lithium.

5. The optical device according to claim 4, wherein
the oxide containing lithium is epitaxial lithium niobate or lithium tantalate.

6. The optical device according to claim 1, wherein
in the cross section perpendicular to the light propagation direction, an angle formed between the substrate and the side surface of the protruding portion of the one optical waveguide among the pair of optical waveguides, at the side at which the one optical waveguide does not face another optical waveguide among the pair of optical waveguides, is 85° or more.

7. The optical device according to claim 1, wherein the at least two optical waveguides are on a light entrance side of the multiplexer and are parallel to each other.

8. The optical device according to claim 1, wherein each optical waveguide has a uniform thickness up to a point of entry into the multiplexer.

* * * * *